(12) United States Patent
Brantley

(10) Patent No.: US 10,300,566 B2
(45) Date of Patent: May 28, 2019

(54) METHOD AND APPARATUS FOR PRECISION ALIGNMENT AND TACK WELDING OF WELD-NECK PIPE FITTINGS TO PIPE

(71) Applicant: Richard Brantley, Midland, TX (US)

(72) Inventor: Richard Brantley, Midland, TX (US)

(*) Notice: Subject to any disclaimer, the term of this patent is extended or adjusted under 35 U.S.C. 154(b) by 69 days.

(21) Appl. No.: 15/648,183

(22) Filed: Jul. 12, 2017

(65) Prior Publication Data

US 2019/0015938 A1  Jan. 17, 2019

(51) Int. Cl.
| | | |
|---|---|---|
| *B23K 37/04* | (2006.01) | |
| *B23K 37/053* | (2006.01) | |
| *F16L 23/026* | (2006.01) | |
| *B23K 101/06* | (2006.01) | |

(52) U.S. Cl.
CPC ...... *B23K 37/0536* (2013.01); *B23K 37/0531* (2013.01); *F16L 23/026* (2013.01); *B23K 2101/06* (2018.08)

(58) Field of Classification Search
CPC ............ B23K 37/0536; B23K 37/0531; B23K 2101/06; B23K 37/04; B23K 37/0417–0452; B23K 37/053–0531; F16L 23/026
USPC ........... 228/212–213, 44, 3–44.5, 47.1, 49.1, 228/49.3; 219/158, 160, 161
See application file for complete search history.

(56) References Cited

U.S. PATENT DOCUMENTS

| | | | | |
|---|---|---|---|---|
| 55,845 A | * | 6/1866 | Francis | B23B 31/40 269/48.1 |
| 56,531 A | * | 7/1866 | Cook | B23B 31/40 269/48.1 |
| 72,904 A | * | 12/1867 | Rees | B23B 31/40 269/48.1 |
| 73,573 A | * | 1/1868 | Brooks | B23B 31/40 269/48.1 |
| 284,641 A | * | 9/1883 | Klein | B23B 31/40 269/48.1 |

(Continued)

OTHER PUBLICATIONS https://www.youtube.com/watch?v=iyJqOTpjxfM.

(Continued)

*Primary Examiner* — Kiley S Stoner
(74) *Attorney, Agent, or Firm* — James L. Jackson

(57) ABSTRACT

Internal clamping of a weld-neck fitting to a pipe in preparation for precision tack welding of the fitting to the pipe is established by a pair of alignment and clamping wedge members, each having alignment and gripping members and angulated reaction surfaces which are positioned within the pipe and weld-neck fitting with the angulated reaction surfaces in relatively moveable engagement. One of the alignment and clamping wedge members is moved linearly, causing the angulated reaction surfaces to translate the linear movement to lateral movement, forcing the alignment and gripping members laterally against the internal surfaces of the pipe and fitting and supporting the fitting in precision aligned relation with the pipe to facilitate tack welding. A gauge member confirms precision alignment of the fitting with the pipe before and after applying the tack welds, then the alignment and clamping apparatus is loosened by opposite linear movement of the wedge members which are removed to permit final weld connection of the fitting to the pipe.

14 Claims, 4 Drawing Sheets

(56) References Cited

U.S. PATENT DOCUMENTS

| | | | | |
|---|---|---|---|---|
| 1,166,284 | A | * | 12/1915 | Vroman .................. B23B 31/40 269/48.1 |
| 1,840,470 | A | * | 1/1932 | Schneider ................. B25B 5/08 269/165 |
| 1,940,910 | A | * | 12/1933 | Hickey .............. B23K 37/0536 269/130 |
| 2,080,906 | A | * | 5/1937 | Boyer ................ B23K 37/0531 269/48.1 |
| 2,167,896 | A | * | 8/1939 | Graham ............. B23K 37/0531 228/50 |
| 2,523,519 | A | * | 9/1950 | Reeves ..................... F16L 1/10 269/48.1 |
| 2,736,286 | A | * | 2/1956 | Britton ............... B23K 37/0536 269/19 |
| 2,777,048 | A | | 1/1957 | Kocks |
| 2,823,634 | A | | 2/1958 | Barth |
| 2,977,916 | A | | 4/1961 | Hawkins |
| 3,031,995 | A | * | 5/1962 | Taylor, Jr. .......... B23K 37/0531 269/48.1 |
| 3,330,021 | A | | 7/1967 | Jacobsen |
| 3,434,709 | A | * | 3/1969 | Ramsay ............... B21D 41/021 269/48.1 |
| 3,451,119 | A | * | 6/1969 | Brown .................. B21D 39/04 269/26 |
| 3,498,518 | A | * | 3/1970 | Price ................. B23K 37/0531 228/40 |
| 3,688,070 | A | | 8/1972 | Smith |
| 3,819,103 | A | * | 6/1974 | Howell ................ B23K 20/085 228/109 |
| 3,894,326 | A | * | 7/1975 | Merriman .......... B23K 37/0533 228/49.3 |
| 4,052,045 | A | | 10/1977 | Shaddix |
| 4,084,739 | A | | 4/1978 | Koltz et al. |
| 4,363,954 | A | * | 12/1982 | Rinaldi ................. B23K 9/035 219/160 |
| 4,496,093 | A | | 1/1985 | Taylor, Jr. |
| 4,685,662 | A | | 8/1987 | Vaughn |
| 4,828,160 | A | | 5/1989 | Sundholm |
| 4,848,734 | A | * | 7/1989 | Ford ........................ H02G 1/08 254/134.4 |
| 4,869,630 | A | * | 9/1989 | Revol ................... F16B 13/122 411/40 |
| 5,094,435 | A | | 3/1992 | Depperman et al. |
| 5,228,181 | A | | 7/1993 | Ingle |
| 5,314,135 | A | * | 5/1994 | Forrest, Jr. .......... B65H 75/242 242/573.7 |
| 5,464,299 | A | | 11/1995 | Scharer et al. |
| 5,538,173 | A | * | 7/1996 | Hummel ............ B23K 37/0531 228/44.5 |
| 5,560,091 | A | | 10/1996 | Labit, Jr. |
| 5,573,229 | A | * | 11/1996 | Lycan ................ B23K 37/0533 269/49 |
| 5,609,291 | A | * | 3/1997 | Hummel ............ B23K 37/0531 228/212 |
| 6,230,381 | B1 | | 5/2001 | Newton |
| 6,357,735 | B2 | | 3/2002 | Haverinen |
| 7,674,418 | B2 | * | 3/2010 | Matsumoto ........... B29C 70/446 264/257 |
| 7,819,388 | B2 | * | 10/2010 | McCallion .............. E02D 5/808 24/136 B |
| 8,397,975 | B1 | | 3/2013 | Franco |
| 10,071,439 | B1 | * | 9/2018 | Misak .................... B23K 20/10 |
| 2002/0060236 | A1 | * | 5/2002 | Jankus ................ B23B 31/4066 228/44.5 |
| 2003/0047650 | A1 | * | 3/2003 | Schnorrer .......... B23K 37/0531 248/62 |
| 2004/0031840 | A1 | * | 2/2004 | Baylot ............... B23K 37/0533 228/44.5 |
| 2016/0114436 | A1 | * | 4/2016 | Lacome ............. B23K 37/0531 29/559 |

OTHER PUBLICATIONS https://www.youtube.com/watch?v=zVnOxddf5ZM.
https://www.youtube.com/watch?v=TBVmQralRv8.
https://www.youtube.com/watch?v=5LB7yFux9-4.
https://www.youtube.com/watch?v=m_nktvamhJg.

* cited by examiner

METHOD AND APPARATUS FOR PRECISION ALIGNMENT AND TACK WELDING OF WELD-NECK PIPE FITTINGS TO PIPE

BACKGROUND OF THE INVENTION

Field of the Invention

The present invention relates generally to a method and apparatus for aligned positioning of weld-neck pipe fittings, such as pipe flange fittings relative to the beveled end of pipe to permit tack-welding of the fittings to secure the fittings in immoveable relation with the pipe to permit finish welding. More particularly, this invention concerns the use of an alignment method and system that establishes precision alignment of a pipe flange fitting to a pipe, confirming precision pipe flange alignment before and after tack welding the fitting to the pipe. This invention also permits simple and efficient precision spacing of the tubular beveled end of a weld-neck pipe fitting with the beveled end of a pipe and permits verification of precise perpendicular orientation of the sealing flange of a weld-neck pipe flange fitting with respect to the external cylindrical surface and longitudinal center-line of the pipe by means of a position confirming inspection gauge member.

Description of the Prior Art

Typically for welding a pipe flange fitting to a pipe section the tubular section of a flange fitting is positioned with a spacing of from about 1/32" to about 1/8" (spacing could be more or less depending upon the requirements of the weld procedure specifications being followed) from the prepared beveled end of the pipe and with the cylindrical tubular beveled end section of the fitting being concentrically aligned with the cylindrical beveled end of the pipe. With the weld-neck pipe fitting or pipe flange fitting so positioned and with its precision position confirmed, a welder will tack-weld the aligned joint in several places to ensure that the weld-neck pipe fitting is maintained in fixed relation with the beveled end of the pipe during a subsequent finished joint welding process. Precision positioning of a weld-neck fitting is established when the tubular beveled weld connection section of the pipe fitting is located in precisely concentric relation with the longitudinal center-line and cylindrical structure of the pipe and the sealing face of the flange of the fitting is oriented in precisely perpendicular relation with the longitudinal center-line of the pipe to which it is to be welded. After confirming that the flange fitting or other pipe fitting is immovably tack-welded to the pipe to prevent any misaligning movement of the fitting relative to the pipe during a finish welding operation a circular weld involving one or more circular welding passes at the joint of the fitting to the pipe will then be made to finish the weld connection. Since a weld-neck flange fitting is typically of short length, it is often quite difficult to position it accurately relative to the pipe and to secure it immovably to the pipe, especially when the positioning and welding work is done during field conditions.

If the tack welded flange fitting is determined to have been inaccurately positioned following installation of the tack-welds, the sealing flange of the fitting will not be capable of establishing precision sealing with respect to the sealing flange of an adjacent pipe member. In such case the tack-welds to the fitting and to the pipe must be cut away and the weld-neck fitting must again be positioned with the face of its flange precisely perpendicular with the central longitudinal axis of the pipe and must be secured immovably in this precisely aligned position until the fitting is again tack-welded and thus fixed to the pipe in preparation for finish welding. When weld-neck flange fittings are welded in commercial welding shop conditions, for the most part heavy and expensive set-up machinery is used to establish accurate positioning of weld-neck flange fittings relative to pipe. Still, it is typical for weld-neck pipe fittings to be tack-welded to the pipe and then checked for alignment before the finish welding operation is done. With precision alignment and proper tack-welding confirmed, a finish welding operation is done to permanently connect the weld-neck fitting to the pipe. In small shop conditions and field conditions precision set-up of weld-neck flange fittings and some other pipe fittings can be a matter of trial and error. It is desired, therefore, to provide a simple and efficient system for establishing precision alignment of weld-neck pipe fittings to pipe, confirming such precision alignment and then maintaining such precision alignment while securing weld-neck pipe fittings in immoveable relation with the pipe by means of tack-welds. This system also facilitates checking the pipe fitting installation process after completion of the tack-welding operation to ensure precision alignment of the fitting with the pipe before initiating the final welding operation.

Many welding operations for weld-neck flange fittings are carried out in the field by manual welding set-up and welding operations. Though pipe flange weld-neck fittings have been welded to pipes for many years, it has long been determined that it is exceedingly difficult to establish stable precision positioning of a pipe flange fitting to a section of pipe so that the pipe flange fitting is oriented with its flange face precisely perpendicular to the external cylindrical surfaces of both the pipe and the tubular section of the pipe flange fitting and thus perpendicular with the longitudinal axes of the flow passages of the pipe and the pipe flange fitting.

Various types of pipe alignment and set-up tools have been developed over the years to achieve precision positioning of pipe and pipe joint components in preparation for welding as evidenced by internal pipe alignment apparatus of U.S. Pat. No. 2,977,916 of Hawkins and U.S. Pat. No. 5,538,173 of Hummel Internal expanding segment type pipe alignment apparatus is presented by U.S. Pat. No. 5,609,291 of Hummel, U.S. Pat. No. 4,084,739 of Koltz et al and U.S. Pat. No. 6,119,916 of Anderson, et al. Other apparatus for supporting straight or curved pipe sections for tack welding is shown by U.S. Pat. No. 8,397,975 of Franco. Apparatus that achieves internal clamping within a hollow profile member by relative linear movement of two wedge-like wedge sleeve halves that develop lateral expansion movement upon screw driven actuation is shown by U.S. Pat. No. 5,464,299 of Scharer et al.

SUMMARY OF THE INVENTION

It is a principal feature of the present invention to provide a novel method and apparatus for simple and efficient positioning of a weld-neck pipe flange fitting relative to the beveled end of a pipe to which it is to be welded.

It is another feature of this invention to enable confirmation of such precision positioning with the face of the sealing flange of the fitting located precisely perpendicular with the longitudinal axis of the pipe and with the axis of the pipe flange fitting precisely coincident with the longitudinal axis of the pipe and to permit tack welding of the circular weld connection spool of the pipe flange fitting and the pipe before accomplishing a circular weld connection of the said pipe flange fitting and the pipe.

It is a further feature of the present invention to provide a novel method and apparatus for positioning and weld mounting a pipe fitting, such as a pipe flange fitting to an end of a section of pipe by using a pair of relatively moveable alignment components that are expanded within the pipe and pipe flange fitting by relatively moveable tapered surfaces, causing edges or surfaces thereof to establish aligning and gripping contact with the cylindrical internal surfaces of a section of pipe and with a weld-neck pipe fitting. The weld-neck pipe fitting may be a pipe flange fitting or any other type of pipe fitting having a cylindrical flow passage and a weld prepared cylindrical tube or spool that is intended for positioning in slightly spaced linear alignment with the weld prepared end of a pipe.

It is also a feature of this invention to utilize a novel flange fitting alignment detection device that engages the outer cylindrical surface of the pipe and also engages the face of the pipe flange fitting to confirm precision perpendicular alignment of the flange face with respect to the outer cylindrical surface of the pipe.

It is another feature of this invention to provide an apparatus and process for aligning a weld-neck flanged pipe fitting for weld connection with a pipe and ensuring precision location of the bolt holes of the connection flange of the fitting to permit ease of bolted connection of the sealing flange of the fitting with the sealing flange of an adjacent pipe.

Briefly, the various objects and features of the present invention are realized through the provision of a pair of substantially rigid wedge-shaped members that may be constructed of steel, aluminum, bronze or other suitable metal material or may be formed of any of a number of suitable polymer materials or composites. Each of the wedge-shaped members has an inclined reactive member and has an external structure defining spaced pipe engaging members that establish internal clamping and aligning engagement with the inner surface of a cylindrical pipe and with the cylindrical internal surface of a weld-neck fitting. The inclined reactive members are positioned in engagement when the wedge-shaped members are positioned within the pipe and the weld-neck fitting and achieve lateral expansion and internal clamping movement of the wedge-shaped members when one of the wedge-shaped members is moved linearly in one direction relative to the other wedge-shaped member. In a preferred embodiment of this invention each wedge-shaped member defines a pair of spaced generally parallel elongate clamping corners that establish line contact with the internal cylindrical surface of the pipe and with the internal cylindrical surface of a weld-neck fitting, such as a weld-neck fitting having a pipe connection flange and a tubular weld connection spool. The wedge-shaped internal clamping and alignment members are positioned partially within the flow passage of a pipe and within the flow passage of a weld-neck pipe fitting to be secured to the pipe by welding, with the inclined reaction surfaces of the wedge-shaped members in engagement.

The two wedge-shaped members are positioned in loosely assembled relation with the pipe and the weld-neck fitting and the weld-neck fitting is then positioned in closely spaced relation with the beveled end of the pipe. For establishing lateral internal clamping movement of the assembled wedge-shaped members within the cylindrical surfaces to provide clamping or gripping activity, one of the wedge-shaped members is maintained substantially static while the other of the wedge-shaped members is moved linearly within the cylindrical surfaces of the pipe and fitting. Upon relative linear movement of the wedge-shaped members, inclined reactive geometry of each of the wedge-shaped members causes lateral expansion of the assembled wedge members, driving the spaced parallel corners of the wedge members with sufficient force to establish internal clamping thereof within the pipe and fitting thus securing the weld-neck fitting in a selected precision position relative to the end of the pipe to which the fitting is to be welded. Relative movement of the wedge-shaped members within the pipe and fitting causes centering alignment of the weld-neck fitting relative to the flow passage of the pipe, thus positioning the circular end of the tubular weld connection spool of the fitting in precisely aligned relation with the circular beveled end of the pipe.

The accuracy of the assembly of the weld-neck fitting to the pipe for precise perpendicular orientation of the face of the sealing flange of the fitting with respect to the longitudinal axis of the pipe, is then verified using a special alignment confirmation tool or gauge having a first straight edge for orienting contact with the external cylindrical surface of the pipe and a second straight edge oriented in precisely perpendicular relation with the first straight edge for contact with the circular sealing face of the connection and sealing face of the weld-neck fitting. This special gauge or alignment tool is not a part of the present invention, but is mentioned here to provide the reader with the knowledge that precision alignment of weld-neck fittings relative to pipe can be achieved through the use of a simple gauge device. Obviously, other more complicated and expensive alignment tools may also be used without departing from the spirit and scope of this invention.

With the accuracy of the assembly thus verified, tack welds are then made to establish a fixed relation of the weld-neck pipe fitting to the pipe. The tack welds function to secure the weld-neck fitting in precisely positioned relation with the end of the pipe and have sufficient structural integrity to prevent any misaligning movement of the fitting during finish welding of the joint. Though not absolutely necessary, after the tack welds have been made, the gauge tool is typically used again to make final confirmation of precision positioning of the weld-neck fitting with respect to the pipe prior to proceeding with the circular finish weld that achieves permanent connection of the fitting to the pipe.

When weld-neck pipe fittings incorporate a connection and sealing flange it is often necessary to ensure that the bolt holes of the flange are properly oriented for alignment with the bolt holes of the connection and sealing flange of a pipe to which the pipe fitting is designed to be connected. Typically, when a weld-neck flange fitting is being aligned and supported in relation to the pipe to which it will be welded, two adjacent bolt holes of the connection and sealing flange are aligned horizontally. A tool, not forming a part of the present invention, is commercially available that has a tool body providing support for two spaced hole engaging members that each have conical surfaces for engagement within two of the bolt holes of the connection and sealing flange. With these bolt hole engaging devices in place, a level device can engage the hole engaging members and confirm precise horizontal positioning of the two bolt holes. Prior to installing the tack welds, the flanged fitting can be rotated as necessary to ensure precise horizontal positioning of the two bolt holes of the flange, thereby confirming that the bolt holes of the flange will match the positions of the bolt hole of the connection and sealing flange of a pipe to which the flange of the fitting will be connected. The internal clamping wedge assembly of the present invention is efficiently used for alignment and internal clamping of a weld-neck flange fitting in the manner discussed in detail above, while also employing a bolt hole alignment tool to achieve and confirm precise horizontal orientation of two adjacent bolt holes of the connection and sealing flange of the fitting.

After the tack welding operation has been completed, and prior to welding the entire circumference of the joint, one of the wedge-shaped members is moved linearly relative to the other wedge-shaped member to collapse the internal clamping wedge assembly and release its gripping or clamping force within the pipe and the weld-neck fitting and thereby permitting removal of the clamping wedge assembly from the pipe and fitting. Following removal of both of the alignment and clamping wedge-shaped members, a circular finish welding operation is then accomplished to permanently secure the weld-neck fitting in assembly with the pipe.

BRIEF DESCRIPTION OF THE DRAWINGS

So that the manner in which the above recited features, advantages and objects of the present invention are attained and can be understood in detail, a more particular description of the invention, briefly summarized above, may be had by reference to the preferred embodiment thereof which is illustrated in the appended drawings, which drawings are incorporated as a part hereof.

It is to be noted however, that the appended drawings illustrate only a typical embodiment of this invention and are therefore not to be considered limiting of its scope, for the invention may admit to other equally effective embodiments.

In the Drawings:

Figure 1:
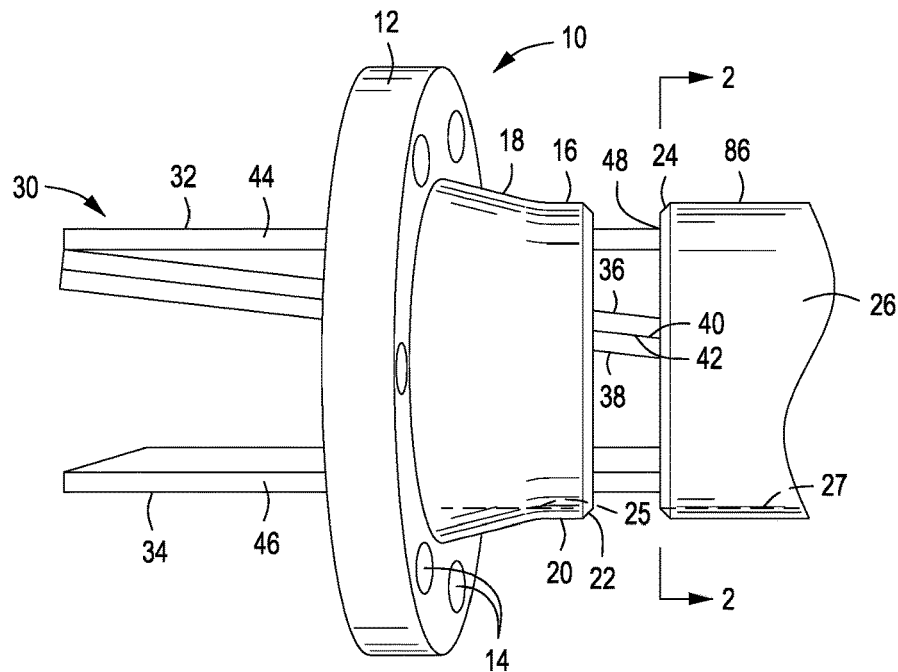
Figure 2:
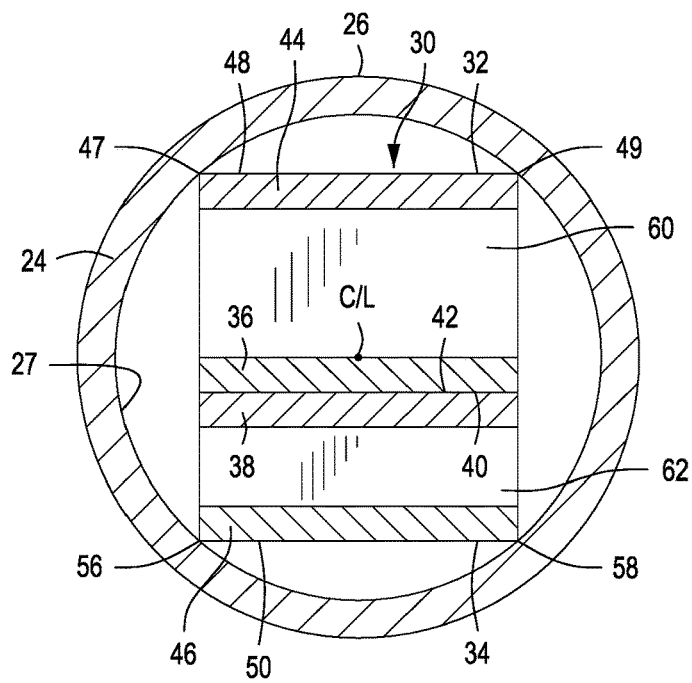
Figure 3:
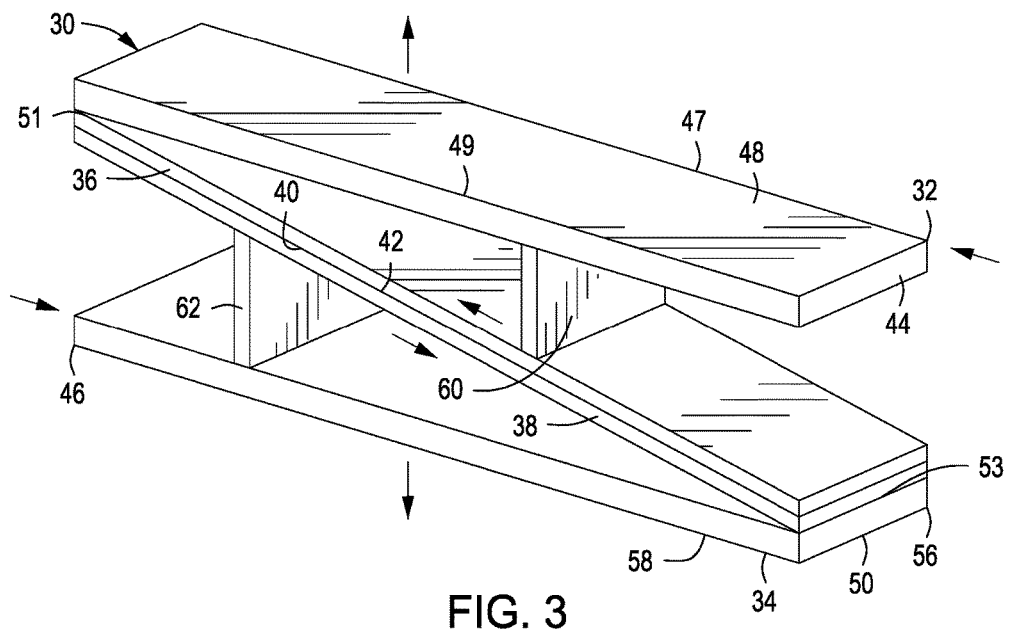
Figure 4:
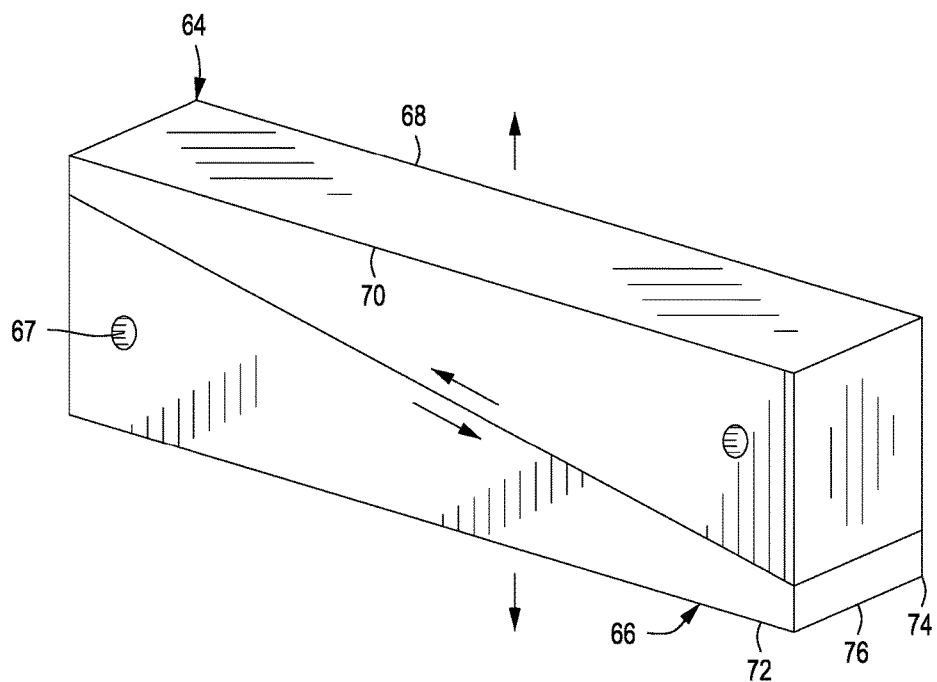
Figure 5:
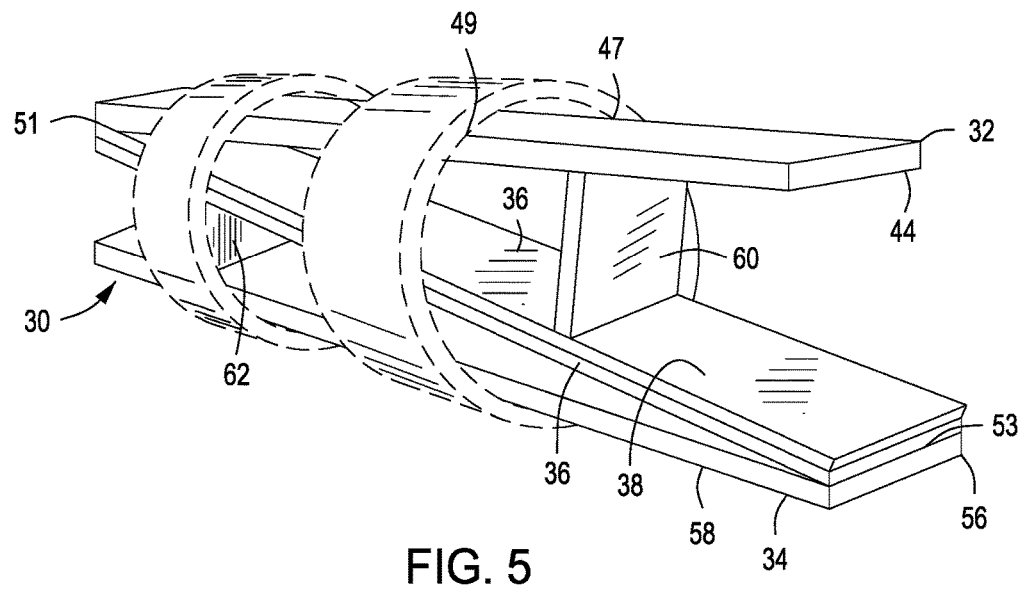
Figure 6:
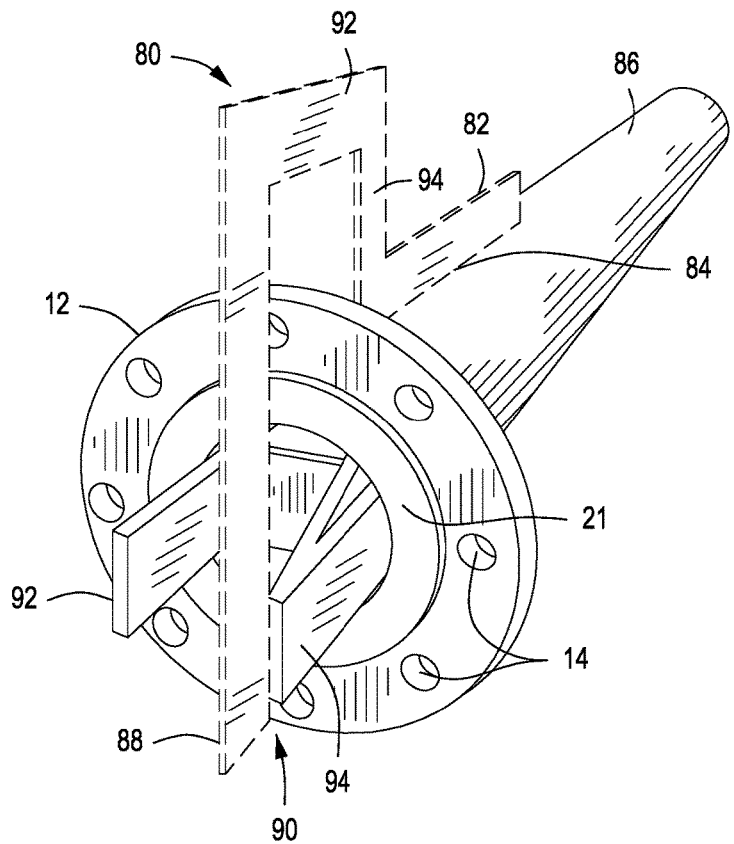
Figure 7:
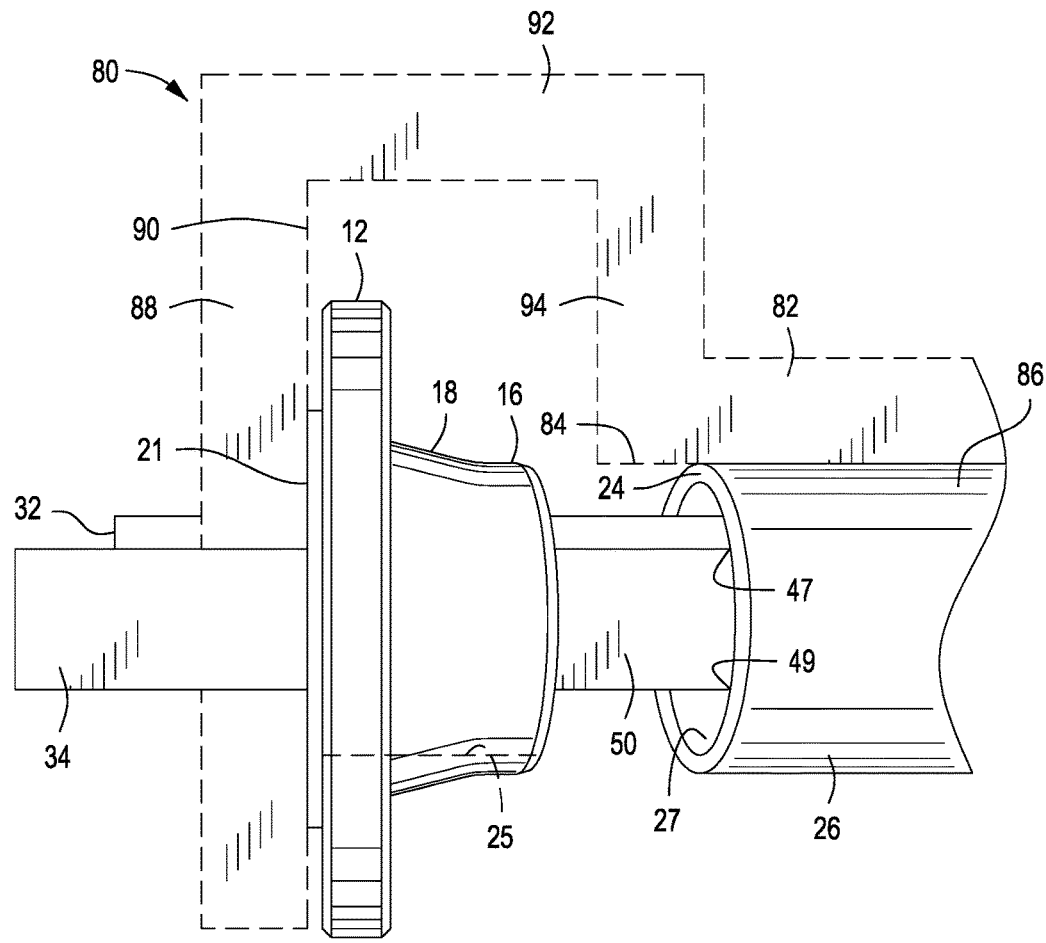

FIG. 1 is an isometric illustration showing a weld-neck pipe fitting in the process of being moved to a position with its tubular weld connector spool disposed in closely spaced precision aligned relation with the weld connector end of a pipe of substantially the same internal diameter and being secured in place by an alignment and internal clamping tool embodying the principles of the present invention;

FIG. 2 is a section view taken along line 2-2 of FIG. 1 showing the flow passage of the pipe and showing spaced contact of outer alignment and clamping portions of the two wedge-shaped sections of the alignment and clamping tool of the present invention;

FIG. 3 is an isometric illustration showing the wedge-shaped alignment and internal clamping devices of FIG. 1 being positioned for relative linear expansion and pipe gripping movement, the wedge-shaped devices being fabricated from strips of plate metal;

FIG. 4 is an isometric illustration showing solid internal alignment and clamping wedge devices composed of lightweight polymer material or a lightweight metal and functioning in similar manner for internal gripping and precision positioning of a weld-neck pipe fitting or any other tubular member relative to the weld prepared end of a section of pipe;

FIG. 5 is an isometric illustration showing the expanding and internal gripping wedges of FIG. 2 being expanded within tubular members by relative linear movement to establish internal alignment and frictional gripping contact of four linear corners of the expansion wedge devices with the cylindrical internal surfaces of axially spaced pipe sections;

FIG. 6 is an isometric illustration showing the internal alignment and internal clamping wedge members of this invention being positioned within the flow passages of a pipe and weld-neck pipe fitting for expansion and gripping thereof and further showing a precision alignment gauge engaging and confirming precision perpendicular positioning of the sealing face of the weld-neck fitting; and FIG. 7 is another isometric illustration showing a weld-neck pipe fitting being moved toward proper tack-welding position relative to a pipe, being disposed in supported relation by the expanding and internal gripping wedges of FIG. 2, with the circular sealing face of its sealing flange in precisely perpendicular relation with the pipe as confirmed by the precision alignment confirming gauge of FIG. 6.

DETAILED DESCRIPTION OF PREFERRED EMBODIMENT

Referring now to the drawings and first to FIG. 1, a sealing flange type weld-neck pipe fitting for a welded connection to a pipe is shown generally at 10 and has a sealing flange member 12 having an array of bolt holes 14 that receive threaded bolts or studs for securing the sealing flange member in tightly sealed relation with an identical sealing flange member of a fluid or gas handling piping system. The pipe fitting has a tubular weld connection spool 16 extending from one side of the sealing flange and being designed for optimum strength to accommodate piping loads. The weld connection spool 16 has a tapered connection section 18 projecting from the sealing flange member 12 and merging with a generally cylindrical connection section 20 typically having a circular beveled weld preparation.

The sealing flange 12 defines a circular planar sealing face 21, shown in FIG. 6, that establishes sealing engagement with an identical sealing flange of a pipe as the sealing flanges are drawn together by tightening of the bolts or studs that engage the bolt holes 14 of adjacent sealing flanges. The connection section 20 defines a circular end 22 that is of generally tapered configuration for a weld connection with a similar circular tapered end 24 of a section of pipe 26. Both the pipe flange fitting 10 and the pipe 26 may have flow passages of substantially identical diameter being defined by internal generally cylindrical surfaces 25 and 27. The prepared beveled end of the weld connection spool of the fitting is typically positioned in closely spaced relation with the prepared, beveled end of the pipe, in the order of from about 1/32" to about 1/8" (the spacing could be more or less depending upon the requirements of the weld procedure specifications being followed) to facilitate complete weld penetration, for an optimum welded connection. In FIG. 1, for the purpose of simplicity and to promote ready understanding of this invention, the weld connection spool 16-20 is shown to have much greater spaced relation with the weld prepared end of the pipe 26, a condition that exists as the weld-neck fitting is being moved toward the desired closely spaced position for optimum weld connection.

Shown in FIG. 1 being positioned within the flow passages of the weld-neck pipe flange fitting and the pipe 26 is an internal alignment and clamping mechanism shown generally at 30 having two generally triangular wedge-shaped internal alignment and clamping members 32 and 34 that are shown to be positioned adjacent to one another in FIG. 3. The internal alignment and clamping wedge-shaped members are not connected with one another according to this embodiment, though they may be connected in moveable assembly without departing from the spirit and scope of this invention. Each of the wedge-shaped members 32 and 34 define substantially planar elongate substantially straight reaction members 36 and 38, respectively, that are oriented in angular relation with the center-line C/L of the pipe flange fitting and pipe. The reaction members 36 and 38 are shown in FIG. 3 to define substantially straight reaction surfaces 40 and 42 that are shown in reactive engagement with one another when the internal pipe alignment and clamping system 30 is in use. It is to be borne in mind, however, that the reaction surfaces of the reaction members 36 and 38 need not be of planar configuration since the reaction geometry of these members may have forms, such as reaction ridges or grooves, that cause reactive lateral expansion or collapsing movement of the internal pipe alignment and clamping system 30 when the generally triangular wedge-shaped internal alignment and clamping members 32 and 34 are moved linearly relative to one another.

As shown in FIG. 2 and in FIG. 3, the angular reaction surfaces 40 and 42 of the angularly oriented reaction members 36 and 38 achieve lateral expansion or contraction movement of the wedge-shaped members 32 and 34, as shown by movement arrows, when the wedge-shaped members are moved substantially linearly relative to one another. The outer portions of each of the wedge-shaped members 32 and 34 have substantially straight and rigid members 44 and 46, that are defined by rigid metal straps according to the preferred embodiment and best mode of the invention. These rigid metal straps preferably have substantially straight and planar surfaces 48 and 50 that are disposed in substantially parallel relation when the expanding wedge apparatus is in use.

As shown in FIG. 1 and as further shown in the transverse section view of FIG. 2 and in FIG. 3, the substantially straight member 44 of the expanding wedge section 32 defines two spaced parallel straight edged corners 47 and 49 that establish spaced and generally parallel line contact with the cylindrical internal surfaces 25 of the weld-neck pipe fitting 10 and 27 of the pipe 26. The angularly oriented reaction member 36 and the substantially straight member rigid 44 of the expanding wedge section 32 are connected at one end by an end weld 51 or by any other means for fixed connection. Likewise, the angulated reaction member 38 and the substantially straight member 46 are connected by an end weld 53. As further shown in the section view of FIG. 2, and in FIGS. 3, 5 and 6 expanding wedge section 34 has an outer straight and rigid portion 50 that defines two spaced parallel straight edged corners 56 and 58 that establish spaced parallel internal line contact with the internal cylindrical surfaces 25 and 27 of the weld-neck pipe fitting and the pipe. Thus, the assembled wedge-shaped members 32 and 34 establish clamping line contact at four spaced internal locations with both the pipe and weld-neck fitting to achieve precision alignment of the weld-neck fitting with respect to the pipe. The assembled wedge-shaped members 32 and 34 also establish sufficient internal clamping force to achieve support of the weld-neck fitting by the pipe.

To enhance the structural integrity of the wedge-shaped members, transverse structural supports maintain proper angular positioning and resist bending or other deformation thereof under internal clamping load. For example, as shown in FIG. 3, wedge-shaped member 32 includes a structural support wall 60 that is welded or otherwise fixed to the angularly oriented strap member 36 and to the rigid strap member 44 and serves to maintain the strap members 44 and 36 fixed at the desired angle for efficient internal clamping within the pipe and weld-neck fitting. Likewise wedge member 34 has a structural support wall 62 that is welded or otherwise fixed to the straight rigid strap member 46 and to the angulated reaction member 38 and serves to maintain the strap members 38 and 46 fixed at the desired angle for alignment of the weld-neck fitting with the pipe member to promote efficient internal clamping.

The wedge-shaped alignment and clamping members may have forms other than the open wedge structure shown in FIGS. 1-3. For example, as shown in FIG. 4 a pair of wedge-shaped alignment and clamping members shown generally at 64 and 66 may be of substantially solid structure, being formed of a lightweight structure such as a polymer material, a lightweight metal such as an aluminum alloy or a composite material such as a filled fiberglass or the like. The wedge-shaped members 64 and 66 may be substantially identical. The internal alignment and clamping wedge-shaped member 64 defines elongate parallel alignment and clamping corners 68 and 70 that function in the same manner as discussed above in connection with FIGS. 1-3. Likewise, the internal alignment and clamping wedge-shaped member 66 defines elongate parallel alignment and clamping corners 72 and 74 with a surface 76 therebetween that may be of planar configuration if desired. Though internal clamping is accomplished by forceful engagement of the spaced clamping corners of each wedge-shaped member, the wedge members may be provided with spaced clamping buttons or clamping ridges that engage the inner cylindrical surfaces of the weld-neck fitting and the pipe with sufficient force to establish immoveable clamping with both the weld-neck fitting and pipe and retain the weld-neck fitting in immoveable assembly with the pipe, sufficient to permit a tack welding operation to fix the fitting to the pipe.

It should be borne in mind that the spirit and scope of the present invention is not intended to be limited by the metal strap welded construction that is shown in the drawings and described herein, because other embodiments of this invention may be provided if desired. For example, the internal alignment and clamping wedge sections may be composed of any relatively lightweight polymer material or a composite of polymer and metal materials having sufficient structural integrity for supporting a pipe flange fitting or other type of pipe fitting in aligned assembly with a section of pipe.

As shown in FIG. 1 and the transverse section view of FIG. 2, the substantially straight members 44 and 46 of the alignment and internal clamping wedge-shaped members each define two spaced parallel straight edged corners that establish spaced parallel line contact with the cylindrical internal surface 25 of the pipe flange fitting 10 and the internal cylindrical surface 27 of the pipe 26. As shown in the transverse section view of FIG. 2, and in FIGS. 1, 3-6, wedge-shaped member 34 has an outer portion 50 that defines two spaced parallel straight edged corners 56 and 58 that establish spaced parallel line contact with the internal cylindrical surface 27 of the pipe 26 and the internal cylindrical surface 25 of the pipe flange fitting 10. Similarly, the expanding wedge-shaped member 32 has an outer portion 48 that defines substantially straight and parallel corners 47 and 49 that function when the wedge members are in engagement to establish multiple locations of internal essential line contact engagement with opposite internal sides of both the pipe and weld-neck pipe flange fitting to establish centering of the internal alignment mechanism within the pipe and establish centering of the weld-neck fitting relative to the pipe.

Operation

Use of the method and apparatus of the present invention that is described herein for securing a weld-neck fitting, typically a flange type fitting, to a pipe is typically initiated by assembling two wedge-shaped members 32 and 34 of the internal clamping assembly 30 in collapsed and loose assembly with the angulated reaction surfaces 40 and 42 thereof in contact. A welder will then position an end portion of the assembly within the cylindrical flow passage of the pipe and with the opposite end portion of the assembly projecting from the pipe. A weld-neck fitting 10 is then positioned with its cylindrical flow passage receiving the opposite end portion of the internal clamping assembly and with an end portion of the assembly projecting from the flow passage of the fitting and extending beyond the circular sealing projection 21 of the flange or flow passage opening of the fitting as shown in FIGS. 1, 6 and 7. The weld-neck fitting 10 will then be moved along the length of the internal clamping assembly 30 until the beveled end 22 of the connection spool 16 of the fitting is located in closely spaced relation with the circular beveled end 24 of the pipe 26.

One of the internal alignment and clamping wedge-shaped members 32 or 34 is then moved linearly relative to the other internal alignment and clamping wedge-shaped member with sufficient force that the inclined reactive surfaces 40 and 42 react and drive the substantially straight and rigid members laterally, as shown by the force and movement arrows in FIGS. 3 and 4. In a simple form of the present invention, movement of a wedge-shaped member for tightening and generation of clamping force can be accomplished by striking the end of one of the wedge-shaped members with a hammer. However, relative linear movement of one wedge-shaped member relative to the other may be accomplished by any suitable means, such as application of force by a tool that is energized mechanically, electrically, hydraulically or pneumatically. This lateral movement causes the respective straight corners 47 and 49 of the straight rigid member 44 and 56 and 58 of the straight and rigid member 50 to be moved laterally into internal clamping engagement with the internal cylindrical surface 27 of the pipe 26 and with the internal cylindrical surface 25 of the weld-neck fitting 10. Such lateral movement causes the elongate straight corners of the straight and rigid members 44 and 50 to be driven laterally into forcible internal clamping engagement with the internal cylindrical surfaces of the pipe and fitting. This internal clamping engagement occurs at multiple locations of internal essential line contact engagement with the internal cylindrical surfaces of the pipe and the weld-neck fitting with sufficient force to support the weld-neck fitting in properly aligned and slightly spaced position by the pipe and in position for tack welding.

Prior to the tack-welding operation, it is desirable to ensure that the weld-neck pipe fitting is in precise alignment with the weld prepared or beveled end of the pipe, such that the circular planar sealing face 21 of a pipe sealing flange 12, if provided, is located in precisely perpendicular relation with the pipe and is located in precisely concentric relation with the pipe. This feature is accomplished by means of a position confirming gauge member shown in broken line generally at 80 in FIGS. 6 and 7. This gauge member does not comprise any portion of the present invention, but is shown in the drawings because of its value, especially when weld-neck flange fittings are being welded during field conditions. The position confirming gauge member has a pipe engagement arm 82 that is an integral or one-piece device having a straight edge 84 that is intended to be positioned in longitudinal engagement with the external cylindrical surface 86 of the pipe 26. The position confirming gauge member 80 defines a second pipe flange engagement arm 88 having a straight edge 90 that is positioned in precisely perpendicular relation with the straight edge 84 of the pipe engagement arm 82. The circular sealing projection 21 of the sealing flange 12 of the weld-neck fitting 10 is positioned in precisely perpendicular relation with the pipe 26 and its cylindrical external surface when the straight edge 84 is in engagement with the external surface of the pipe 86 and the straight edge 90 of the second gauge arm 88 is in engagement across the entire sealing face 21 of the sealing flange 12.

To accommodate the circular dimension of the sealing flange and to adapt the position confirming gauge member 80 for use with sealing flanges of different dimension, the position confirming gauge member 80 is provided with an off-set section 92 from which the second gauge arm 88 depends and from which a connection arm 94 also depends. The pipe engagement arm 82 is connected with and supported by the connection arm 94. The position confirming gauge member is preferably composed of flat metal stock, such as stainless steel or chrome plated steel for corrosion resistance, but can be composed of any number of suitable materials, such as a durable polymer, fiberglass, or the like.

After the precisely aligned and properly spaced position of the weld-neck fitting has been confirmed, several tack welds, typically three or more, are then made at spaced locations about the joint to secure the weld-neck fitting in precisely aligned and immoveable relation with the pipe. Typically, after the tack-welding operation has been completed, the position confirming gauge member 80 is then used again to ensure that the properly aligned and spaced position of the weld-neck fitting has not been changed during the tack welding operation.

At this point loosening of internal clamping is accomplished by opposite relative linear movement of the wedge-shaped members wherein one of the internal alignment and clamping wedge members is moved linearly in a clamp loosening direction relative to the other internal alignment and clamping wedge member accomplishing lateral movement of the spaced parallel corners of the wedge members away from the internal cylindrical surfaces of the pipe and the weld-neck pipe fitting. The loosened internal alignment and clamping assembly is then removed from the pipe and weld-neck fitting, leaving the weld joint free for the final welding operation permanently connecting the weld-neck fitting to the pipe.

In view of the foregoing it is evident that the present invention is one well adapted to attain all of the objects and features hereinabove set forth, together with other objects and features which are inherent in the apparatus disclosed herein.

As will be readily apparent to those skilled in the art, the present invention may easily be produced in other specific forms without departing from its spirit or essential characteristics. The present embodiment is, therefore, to be considered as merely illustrative and not restrictive, the scope of the invention being indicated by the claims rather than the foregoing description, and all changes which come within the meaning and range of equivalence of the claims are therefore intended to be embraced therein.

I claim:

1. A method for establishing alignment of a weld-neck pipe fitting with an end of a pipe and tack welding the weld-neck pipe fitting to the pipe in preparation for finish welding of said weld-neck pipe fitting to said pipe, comprising:

Positioning an internal alignment and clamping assembly having first and second non-connected wedge-shaped members in loose and relatively linearly moveable relation within a pipe and within a weld-neck pipe fitting to be welded to said pipe, said first and second wedge-shaped members each having substantially straight alignment and clamping members and having angulated reaction members disposed in relatively moveable engagement;

moving said first wedge-shaped member linearly in an alignment and clamping direction within said pipe and said weld-neck pipe fitting relative to said second wedge-shaped member while maintaining said second wedge-shaped member substantially static within said pipe and said weld-neck pipe fitting causing reaction of said angulated reaction members with one another resulting in lateral expansion movement of said substantially straight alignment and clamping members to achieve internal clamping and aligning relation thereof within said pipe and said weld-neck pipe fitting and supporting said weld-neck pipe fitting in aligned relation with said pipe;

establishing tack welds securing said weld-neck pipe fitting in aligned immoveable and supported relation with said pipe;

when release of said internal alignment and clamping is desired maintaining said first alignment and clamping wedge-shaped member substantially static within said pipe and said weld-neck pipe fitting and moving said second alignment and clamping wedge-shaped member linearly in a clamp releasing direction opposite said clamping direction permitting lateral collapsing and clamp releasing movement of said internal alignment and clamping assembly; and removing said internal alignment and clamping assembly from said pipe and said weld-neck pipe fitting.

2. The method of claim 1, comprising:
after lateral expansion and internal clamping of said internal clamping assembly within said pipe and said weld-neck pipe fitting and before establishment of said tack welds, determining alignment and spacing of said weld-neck pipe fitting with the pipe.

3. The method of claim 2, comprising:
the weld-neck pipe fitting defines a sealing flange having a planar sealing face; and
prior to making said tack welds, determining perpendicular orientation of said planar sealing face of said sealing flange of said weld-neck pipe fitting relative to said pipe.

4. The method of claim 1 wherein each of said first and second angulated reaction members are angulated substantially planar reaction surfaces on said first and second wedge-shaped members, said method comprising:
for internal clamping of said first and second wedge-shaped members within said pipe and said weld-neck pipe fitting, positioning said first and second wedge-shaped members within said pipe and said weld neck fitting with said angulated substantially planar reaction surfaces in surface to surface engagement;
maintaining said first wedge-shaped member substantially static within said pipe and said weld-neck pipe fitting; and
moving said second wedge-shaped member linearly in an internal clamping direction toward said second wedge-shaped member causing said first and second angular planar reaction surfaces to react with one another causing lateral expansion movement of said first and second wedge-shaped members within said pipe and said weld-neck pipe fitting aligning said weld-neck pipe fitting with said pipe and securing said weld-neck pipe fitting in supported relation with said pipe.

5. The method of claim 1 wherein said first and second wedge-shaped members each define external alignment and clamping members disposed for internal alignment and internal clamping engagement with said pipe and said weld-neck pipe fitting, said method comprising:
said method step of moving said first and second wedge-shaped members relative to one another within said pipe and said weld-neck pipe fitting in an internal clamping direction forcing said external alignment and clamping members against internal cylindrical surfaces of said pipe and said weld-neck pipe fitting and accomplishing concentric positioning of said weld-neck pipe fitting relative to said pipe and clamping said weld-neck pipe fitting in substantially immoveable relation with said pipe for weld connection.

6. The method of claim 1 wherein said first and second wedge-shaped members each define spaced substantially parallel external alignment and clamping ridges disposed for internal alignment and internal clamping engagement with the internal cylindrical surfaces of said pipe and said weld-neck pipe fitting, said method comprising:
said method step of moving said first and second wedge-shaped members relative to one another within said pipe and said weld-neck pipe fitting in an internal clamping direction, forcing said spaced substantially parallel external alignment and clamping ridges of each of said first and second wedge-shaped members against internal cylindrical surfaces of said pipe and said weld-neck pipe fitting accomplishing concentric positioning of said weld-neck pipe fitting relative to said pipe and clamping said weld-neck pipe fitting in substantially immoveable aligned relation with said pipe for weld connection.

7. The method of claim 1 wherein said weld-neck pipe fitting has a connection flange oriented in perpendicular relation therewith and defining a sealing face for sealed engagement with a like connection flange, said method comprising:
said method step of moving said first and second wedge-shaped members relative to one another in an internal clamping direction within said pipe and said weld-neck pipe fitting also positioning said connection flange and said sealing face in perpendicular relation with said pipe and said weld-neck pipe fitting.

8. A method for aligning and supporting a weld-neck pipe fitting having an internal cylindrical surface of a designated dimension from a pipe having an internal cylindrical surface of said designated dimension, comprising:
positioning within said pipe and said within said weld-neck pipe fitting a first wedge-shaped member having co-extensive linear aligning engagement with the internal cylindrical surface of said pipe and said internal cylindrical surface of said weld-neck pipe fitting, said first wedge-shaped member having a first angulated reaction member;
positioning within said pipe and said within said weld-neck pipe fitting a second wedge-shaped member having co-extensive linear aligning engagement with said internal cylindrical surface of said pipe and said internal cylindrical surface of said weld-neck pipe fitting, said second wedge-shaped member having a second angulated reaction member;
positioning said first and second angulated reaction members in reactive engagement; and
moving said first and second wedge-shaped members linearly in an internal clamping direction relative to one another within said pipe and said weld-neck pipe fitting causing lateral expansion reaction of said first and second angulated reaction members and causing lateral aligning and clamping expansion of said first and second wedge-shaped members within said pipe and said weld-neck pipe fitting and securing said weld-neck pipe fitting in immoveable aligned relation with said pipe;

when internal clamp releasing is desired moving said first and second wedge-shaped members linearly in an internal clamp releasing direction relative to one another causing lateral collapsing movement of said first and second angulated reaction members and lateral clamp collapsing of said first and second wedge-shaped members within said pipe and said weld-neck pipe fitting and releasing said weld-neck pipe fitting from said immoveable aligning relation within said pipe; and removing said first and second wedge-shaped members from within said pipe and said weld-neck fitting.

9. The method of claim 8, comprising:

after said lateral aligning and clamping expansion of said first and second wedge-shaped members within said pipe and said weld-neck pipe fitting welding said weld-neck pipe fitting to said pipe.

10. The method of claim 8, comprising:

after said lateral aligning and clamping expansion of said first and second wedge-shaped members within said pipe and said weld-neck pipe fitting tack-welding said weld-neck pipe fitting to said pipe fixing said weld-neck pipe fitting in aligned immoveable relation with said pipe; and after said removing of said first and second wedge-shaped members from within said pipe and said weld-neck fitting finishing welding of said weld-neck pipe fitting to said pipe.

11. The method of claim 8 wherein each of said first and second angulated reaction members are angulated substantially planar reaction surfaces on said first and second wedge-shaped members, said method comprising:

for internal clamping of said first and second wedge-shaped members within said pipe and said weld-neck pipe fitting positioning said first and second wedge-shaped members within said pipe and said weld neck fitting with said angulated planar reaction surfaces in surface to surface engagement;

maintaining said first wedge-shaped member substantially static within said pipe and said weld-neck pipe fitting; and moving said second wedge-shaped member linearly in an internal clamping direction toward said second wedge-shaped member causing said first and second angular planar reaction surfaces to react with one another causing lateral expansion movement of said first and second wedge-shaped members within said pipe and said weld-neck pipe fitting aligning said weld-neck pipe fitting with said pipe and securing said weld-neck pipe fitting in supported relation with said pipe.

12. The method of claim 8 wherein said first and second wedge-shaped members each define external alignment and clamping members disposed for internal alignment and internal clamping engagement with said pipe and said weld-neck pipe fitting, said method comprising:

said method step of moving said first and second wedge-shaped members relative to one another within said pipe and said weld-neck pipe fitting in an internal clamping direction forcing said external alignment and clamping members against internal cylindrical surfaces of said pipe and said weld-neck pipe fitting and accomplishing concentric positioning of said weld-neck pipe fitting relative to said pipe and clamping said weld-neck pipe fitting in substantially immoveable relation with said pipe for weld connection.

13. The method of claim 8 wherein said first and second wedge-shaped members each define spaced substantially parallel external alignment and clamping ridges disposed for internal alignment and internal clamping engagement with said internal cylindrical surface of said pipe and said weld-neck pipe fitting, said method comprising:

said method step of moving said first and second wedge-shaped members relative to one another within said pipe and said weld-neck pipe fitting in an internal clamping direction, forcing said spaced substantially parallel external alignment and clamping ridges in internal clamping engagement with internal cylindrical surfaces of said pipe and said weld-neck pipe fitting and accomplishing concentric positioning of said weld-neck pipe fitting relative to said pipe and clamping said weld-neck pipe fitting in substantially immoveable aligned relation with said pipe for weld connection.

14. The method of claim 8 wherein said weld-neck pipe fitting has a connection flange oriented in substantially perpendicular relation therewith and defining a sealing face for sealed connection with a like connection flange, said method comprising:

said method step of moving said first and second wedge-shaped members relative to one another in an internal clamping direction within said pipe and said weld-neck pipe fitting also positioning said connection flange and said sealing face in perpendicular relation with said pipe and said weld-neck pipe fitting.

* * * * *